(12) United States Patent
Ehlert et al.

(10) Patent No.: US 11,343,957 B2
(45) Date of Patent: May 31, 2022

(54) AGRICULTURAL WORK SYSTEM

(71) Applicant: CLAAS Tractor SAS, Vélizy-Villacoublay (FR)

(72) Inventors: Christian Ehlert, Bielefeld (DE); Jan Carsten Wieckhorst, Paderborn (DE); Thilo Steckel, Guetersloh (DE); Reinhold Maehler, Bad Rothenfelde (DE); Heinrich Warkentin, Guetersloh (DE); Andreas Wilken, Bissendorf (DE); Dennis Neitemeier, Lippetal (DE)

(73) Assignee: CLAAS Tractor SAS, Velizy-Villacoublay (FR)

( * ) Notice: Subject to any disclaimer, the term of this patent is extended or adjusted under 35 U.S.C. 154(b) by 369 days.

(21) Appl. No.: 16/574,267

(22) Filed: Sep. 18, 2019

(65) Prior Publication Data
US 2020/0093053 A1 Mar. 26, 2020

(30) Foreign Application Priority Data
Sep. 24, 2018 (DE) ...................... 10 2018 123 480.5

(51) Int. Cl.
| | | |
|---|---|---|
| *A01B 79/00* | (2006.01) | |
| *A01B 69/04* | (2006.01) | |
| *A01D 41/127* | (2006.01) | |

(52) U.S. Cl.
CPC .......... *A01B 79/005* (2013.01); *A01B 69/008* (2013.01); *A01D 41/1274* (2013.01); *A01D 41/1278* (2013.01)

(58) Field of Classification Search
CPC ................ A01B 79/005; A01B 69/008; A01D 41/1274; A01D 41/1278; G06Q 50/02; G06Q 50/30
See application file for complete search history.

(56) References Cited

U.S. PATENT DOCUMENTS

| 8,392,065 B2 | 3/2013 | Tolstedt et al. |
|---|---|---|
| 2010/0145572 A1 | 6/2010 | Steckel et al. |

(Continued)

FOREIGN PATENT DOCUMENTS

| DE | 102008061252 A1 | 5/2010 |
|---|---|---|
| DE | 102019206817 A1 | 12/2019 |

(Continued)

OTHER PUBLICATIONS

European Search Repod dated Feb. 14, 2020 issued in the corresponding European Application No. 19184713 (with English translation of relevant pads).

*Primary Examiner* — Russell Frejd
(74) *Attorney, Agent, or Firm* — Collard & Roe, P.C.

(57) ABSTRACT

An agricultural work system for the optimization of operating parameters, with at least one agricultural work machine having a work unit for carrying out or supporting agricultural work. The agricultural work machine has a driver assistance system for detecting, processing and outputting data relating to an agricultural work order. The driver assistance system is configured to detect a plurality of operating parameters and to allow the operator to rank the detected operating parameters or operating parameter sets with a plurality of different detected operating parameters. Individual ranked operating parameters or sets of operating parameters or all of the ranked operating parameters or sets of operating parameters are retrievably filed in a data pool, and the operating parameters are submitted based on ranking to an algorithm for generating optimized operating parameters for adjustment of the agricultural work machine and/or of the at least one work unit.

14 Claims, 2 Drawing Sheets

(56) References Cited

U.S. PATENT DOCUMENTS

2018/0177136 A1 6/2018 Reimann et al.
2019/0082593 A1* 3/2019 Bollin .................. A01D 41/127

FOREIGN PATENT DOCUMENTS

| EP | 2169504 | A2 | 3/2010 |
| EP | 3000307 | A1 | 3/2016 |
| EP | 3363273 | A1 | 8/2018 |

* cited by examiner

AGRICULTURAL WORK SYSTEM

CROSS-REFERENCE TO RELATED APPLICATIONS

This application claims priority under 35 USC 119 of German Application No. DE 102018123480.5, filed on Sep. 24, 2018, the disclosure of which is herein incorporated by reference.

BACKGROUND OF THE INVENTION

The invention is directed to an agricultural work system and to a method for the optimization of operating parameters using an agricultural work system. An agricultural work system of this kind has at least one agricultural work machine, for example, also a fleet of agricultural work machines, which is coupled in each instance to at least one work unit for carrying out or supporting agricultural work. Such an agricultural work machine may be any agricultural work machine that serves to execute an agricultural work order, for example, soil tillage, such as plows, cultivators, harrows or the like. Such agricultural work machines include tractor units, particularly tractors, but also, in principle, harvesting machines, particularly forage harvesters, combine harvesters or the like. Precedence is given herein to the agricultural work machine configured as tractor, for example. By work units is meant not only installed work units such as inclined conveyors, threshers, choppers or the like, but also mounted implements such as plows, cultivators, harrows or the like.

In agricultural work machines, it is known to detect and evaluate different operating parameters in order to optimize work processes, particularly in a harvesting process. The expression "operating parameter" as used herein is to be understood in a broad sense. It encompasses all of the parameters relevant for the operation of the agricultural work machine and, in particular, for a work order, in particular machine parameters such as, for example, rotational speed or driving speed, work parameters such as, for example, employed work units or the agricultural work order to be carried out and/or environment parameters such as, for example, the quality of the soil or weather. As used herein, an operating parameter also means a corresponding parameter value. The detection of corresponding operating parameters is carried out at least partially in an automated manner by means of a driver assistance system of the agricultural work machine, particularly by means of sensors or input devices for operator input.

In the known agricultural work system (DE 10 2008 061 252 A1) upon which the invention is based, a plurality of operating parameters is detected by means of the driver assistance system of an agricultural work machine, for example, a combine harvester, and is further processed based on predetermined rules (context processing rules) to form a context profile. A context profile of this kind is a quantity of data which characterize a determined situation or determined environmental condition or boundary constraint. The data are, for example, those pertaining to the identity, geographical position and operating state of the agricultural work machine. For example, the data can say that the agricultural work machine is a combine harvester which is located at a determined position at a determined point in time and which drives at a determined speed. Depending on a context profile determined in such a way, machine parameters of the agricultural work machine can then be optimized with respect to a determined agricultural work order which is to be carried out by the work machine. An optimization of this kind is carried out automatically by the driver assistance system, i.e., without the input of the operator. However, owing to the varied applications of an agricultural work machine, particularly a tractor, in connection with a large number of different mounted implements combined with largely unknown environmental conditions, a satisfactory result of the optimization cannot always be achieved with the known agricultural work system.

SUMMARY OF THE INVENTION

The invention addresses the problem of configuring and further developing the known agricultural work system in such a way that an improved optimization of machine parameters is made possible for the broadest possible spectrum of applications.

The above-stated problem is solved in an agricultural work system having at least one agricultural work machine in the form of a tractor, the agricultural work machine having a driver assistance system for detecting, processing and outputting data relating to an agricultural work order, and at least one work unit coupled to the agricultural work machine for carrying out or supporting agricultural work. The driver assistance system is configured to detect a plurality of operating parameters and to allow the operator to rank the detected operating parameters or operating parameter sets with a plurality of different detected operating parameters, in that individual ranked operating parameters or sets of operating parameters or all of the ranked operating parameters or sets of operating parameters are retrievably filed in a data pool. The operating parameters or sets of operating parameters are submitted based on ranking to an algorithm for generating optimized operating parameters or sets of operating parameters for the adjustment of the agricultural work machine and/or of the at least one work unit.

The agricultural work system as proposed herein has, in particular, a tractor as the agricultural work machine. In principle, the solution as proposed herein is also applicable to any other agricultural work machine, for example, a combine harvester or forage harvester. The agricultural work machine has a driver assistance system, meaning in the present instance and preferably a system which assists the operator in the operation of same while carrying out an agricultural work order and during operation on the road or agricultural operations yard. The assistance can relate to driving and/or steering the agricultural work machine or to the evaluation and/or output of operating parameters and corresponding parameter values and particularly also to the open loop control and closed loop control of the agricultural work machine or individual work units, particularly a mounted implement, depending on operating parameters.

A key fundamental consideration is, first of all, that better optimization results can be achieved by including the operator in an optimization process because it is possible for the operator to evaluate the results of a running optimization routine quickly and simply and, in particular, to decide immediately whether or not there has been an improvement compared with the state prior to running the optimization routine. That is, as proposed herein, after running an optimization routine in which one or more operating parameters, particularly machine parameters, and the corresponding parameter values have been changed, operator feedback in the form of a ranking of the optimization results on the part of the operator is compulsorily demanded by the system.

After ranking has been carried out by the operator, the respective changed operating parameter or set of operating parameters obtained in the course of running the optimization routine is saved in a data pool. In particular, a set of operating parameters of this kind also contains a quantity of corresponding parameter values or data which identify a determined situation or determined environmental conditions or boundary constraints, for example, data which relate to identity (kind and/or type), geographical position and operating state of the agricultural work machine.

Further, it is key that the operating parameters or sets of operating parameters filed in the data pool are associated based on the ranking with an algorithm which serves to generate optimized operating parameters or sets of operating parameters. "Based on ranking" means that the respective operating parameter or set of operating parameters and the corresponding parameter values are submitted to the algorithm depending upon the ranking, that is, depending upon the suitability level of the parameter or set of parameters and corresponding parameter values for a determined application (for a determined context) as determined by the operator. For example, only those operating parameters or sets of operating parameters which have been considered by the operator beforehand during the ranking to be suitable for the basic application are submitted to the algorithm. An operating parameter or set of operating parameters is ranked by the operator as "suitable", for example, when this parameter or set of parameters and corresponding parameter values have led to improved results when carrying out the basic agricultural work order.

The work results can be assessed based on criteria such as the quality of the working process, the efficiency of the working process and the work output. The algorithm for generating optimized operating parameters or sets of operating parameters preferably makes it possible to process the data in the data pool in such a way that optimal machine parameters and corresponding values can also be derived for novel, unfamiliar combinations of work machine and work unit, particularly tractor and mounted implement. For example, it is conceivable that a set of parameters previously ranked by the operator for a particular tractor type when plowing under determined environmental conditions is filed in the data pool and the algorithm provides the same or similar set of parameters for a different tractor type when plowing or the same tractor type when cultivating under comparable environmental conditions as optimized parameter set. In the simplest case, however, the algorithm can also consist merely in distinguishing operating parameters or sets of operating parameters ranked as suitable from operating parameters or sets of operating parameters ranked as unsuitable and providing only the operating parameters or sets of operating parameters ranked as suitable to the driver assistance system for retrieval. However, this is only conceivable in case both the operating parameters or sets of operating parameters ranked as suitable and the operating parameters or sets of operating parameters ranked as unsuitable are filed in the same data pool. However, it is also conceivable in principle to file only the operating parameters or sets of operating parameters ranked as suitable in the data pool from the start (crowdsourced truth data pool) and to reject the operating parameters or sets of operating parameters ranked as unsuitable.

Accordingly, with the agricultural work system as proposed herein it is possible to determine a plurality of operating parameters in a context-based manner, for example, by sensors and/or by the operator himself/herself, including in particular not only machine parameters but also data having to do with identity (kind and/or type), geographical position and operating state of the agricultural work machine, including particularly environment parameters. Further, it is then possible to adapt at least one operating parameter, in particular machine parameter, with respect to at least one of the criteria including quality, efficiency and output, by means of the driver assistance system in the course of an optimization routine. The results, i.e., the respective adapted operating parameter or a set of parameters with the respective adapted operating parameter, is then ranked by the operator and the results of the ranking are conveyed to the driver assistance system. The driver assistance system than submits individual operating parameters or sets of operating parameters, for example, only those ranked as suitable, or basically all of the operating parameters or sets of operating parameters, i.e., also those ranked as unsuitable, to the data pool which can then also be accessed by the algorithm for generating optimized operating parameters or sets of operating parameters for adjusting the agricultural work machine and/or a work unit. The data generated by the algorithm can then also be filed in the data pool. In this connection, reference is made to so-called "data mining" which means an automated or partially automated evaluation of large quantities of data for determining hitherto unrevealed relationships.

A detection of data, in particular of the plurality of operating parameters or sets of operating parameters, can be carried out via sensors or by input on the part of the operator. It is also conceivable to provide such data via an internal data source, for example, an internal storage of the agricultural work machine or an internal storage of the work unit or mounted implement, or via an external data source (GPS satellite, weather station, Internet, farm-based computer or the like). In particular, a detectable operating parameter is also the kind and/or the type of working unit, in particular mounted implement. A detection of this operating parameter, i.e., the detection, for example, of the mounted implement, can also be carried out in an automated manner, in particular via RFID, Bluetooth, one or more cameras, M2X communication, ISOBUS, TIM or the like.

The driver assistance system can also be configured for natural language recognition and/or output of data.

A computer can be provided for applying the algorithm, and a data storage is provided for storing the ranked operating parameters or sets of operating parameters in the data pool. The data storage or a separate data storage can also be provided for storing the operating parameters or sets of operating parameters generated by applying the algorithm. The computer and/or the respective data storage can be part of the agricultural work machine. In a particularly preferred manner, the computer and/or the respective data storage are part of an external computer network (cloud) of the agricultural work system. The application of the algorithm and/or the storage of the above-mentioned data are accordingly carried out in a cloud-based manner in particular.

An exchange of data can also be carried out with further agricultural work machines and/or work units. In particular, a plurality of agricultural work machines can also be used to detect operating parameters as described earlier and to file ranked operating parameters retrievably in the data pool. Moreover, the operating parameters or sets of operating parameters generated by the algorithm can also be made available to other agricultural work machines and/or work units, particularly also other, for example, similar, combinations of agricultural work machine and work unit or mounted implement. In particular, this can be carried out by means of telemetry with bidirectional communications and/ or via an off-line optimization on the farm-based computer and subsequent transmission to the respective agricultural work machine and/or by installing a new software update. In particular, optimized adjustment recommendations can be provided for a determined region.

In one embodiment, one or more machine parameters of the agricultural work machine and/or of the respective work unit, work parameters and/or environment parameters are detected as operating parameters. The respective machine parameter is selected from the group comprising driving speed, fuel consumption, delivered drive output, delivered drive torque, rotational speed of the driveshaft, engine lugging, shifting speed, parameters of the shifting characteristic, parameters of the slip control, parameters of the draught control, parameters of the full-load control, the air pressure and/or tire type of the front and/or rear pair of tires, the weight of a front and/or rear ballast device, parameters of the front and/or rear lift mechanism, the top link position, parameters of the traction cylinder, parameters of the hydraulic valve setting, the hollow disk position, the pull point, the pressing pressure, the support pressure, parameters of the conditioner column and/or parameters of the steering system and adjustment changes of the respective machine parameters; and/or the respective work parameter is selected from the group comprising an agricultural work order, the kind and/or type of agricultural work machine, the kind and/or type of the respective work unit, in particular mounted implement, the mechanical, hydraulic and/or electrical connection of the respective work unit to the agricultural work machine, the ISOBUS machine settings, the power requirement of the respective work unit, the working depth and/or working width of the respective work unit, the land use and/or the area capacity; and/or the respective environment parameter is selected from the group comprising the ground profile of the field and/or the current driving path, the size of the field, the current weather data, the GPS position data, the current crop, the current population variety, the current crop character of the field and/or of the current driving path, the current soil character of the field and/or of the current driving path, and/or the history of the field and/or of the current driving path, in particular the previous crop or a previous crop, population variety, crop character and/or soil character.

The sets of parameters to be ranked are combinations of one or more machine parameters, and/or one or more work parameters, particularly one or more work and/or one or more environment parameters.

The algorithm generates the optimized operating parameters or sets of operating parameters for determined combinations of operating parameters, preferably for determined combinations of an agricultural work machine, a work unit and one or more environment parameters.

In a preferred configuration, the driver assistance system allows the operator to select an optimization routine by which one or more operating parameters can be changed according to a predetermined rule. The operating parameter or set of operating parameters obtained through this change is then that which is ranked by the operator, for example, as suitable or unsuitable for the specific application or the specific context. In particular, the optimization routine can optimize the quality of the working process, the efficiency of the working process or the work output. Correspondingly, the operator preferably has the choice between an optimization routine for optimizing the quality of the working process, an optimization routine for optimizing the efficiency of the working process and/or an optimization routine for optimizing the work output. After a corresponding optimization routine has been selected, it can also be provided that one or more suggestions for at least one operating parameter to be changed are presented to the operator by the driver assistance system. In particular, the operator then has the option of accepting or declining a suggestion.

Further, the driver assistance system can also be configured to carry out an assessment of the reasonableness of data entered by the operator. For example, a set of operating parameters which contains the work parameter "plow work order" in a particular situation, for example, immediately after turning around, could have been unintentionally ranked by the operator as suitable even though plowing would not be sensible in this situation. The driver assistance system can then interpret the data entered by the driver as erroneous input and correspondingly prevent the ranked set of parameters from being filed in the data pool.

The invention also relates to a method for the optimization of operating parameters using an agricultural work system, in particular an agricultural work system as proposed herein with at least one agricultural work machine, in particular a tractor, and with at least one work unit for carrying out or supporting agricultural work. The agricultural work machine has a driver assistance system for detecting, processing and outputting data relating to an agricultural work order. As proposed herein, a plurality of operating parameters is detected by the driver assistance system, and the detected operating parameters or operating parameter sets with a plurality of different detected operating parameters are permitted to be ranked by the operator. Further, individual ranked operating parameters or sets of operating parameters or all of the ranked operating parameters or sets of operating parameters are retrievably filed in a data pool, and the operating parameters or sets of operating parameters are submitted, based on ranking, to an algorithm for generating optimized operating parameters or sets of operating parameters for the adjustment of the agricultural work machine and/or of at least one work unit.

BRIEF DESCRIPTION OF THE DRAWINGS

The invention will be described more fully in the following with reference to drawings showing only one embodiment example. In the drawings.

DETAILED DESCRIPTION OF THE EMBODIMENTS

Figure 1:
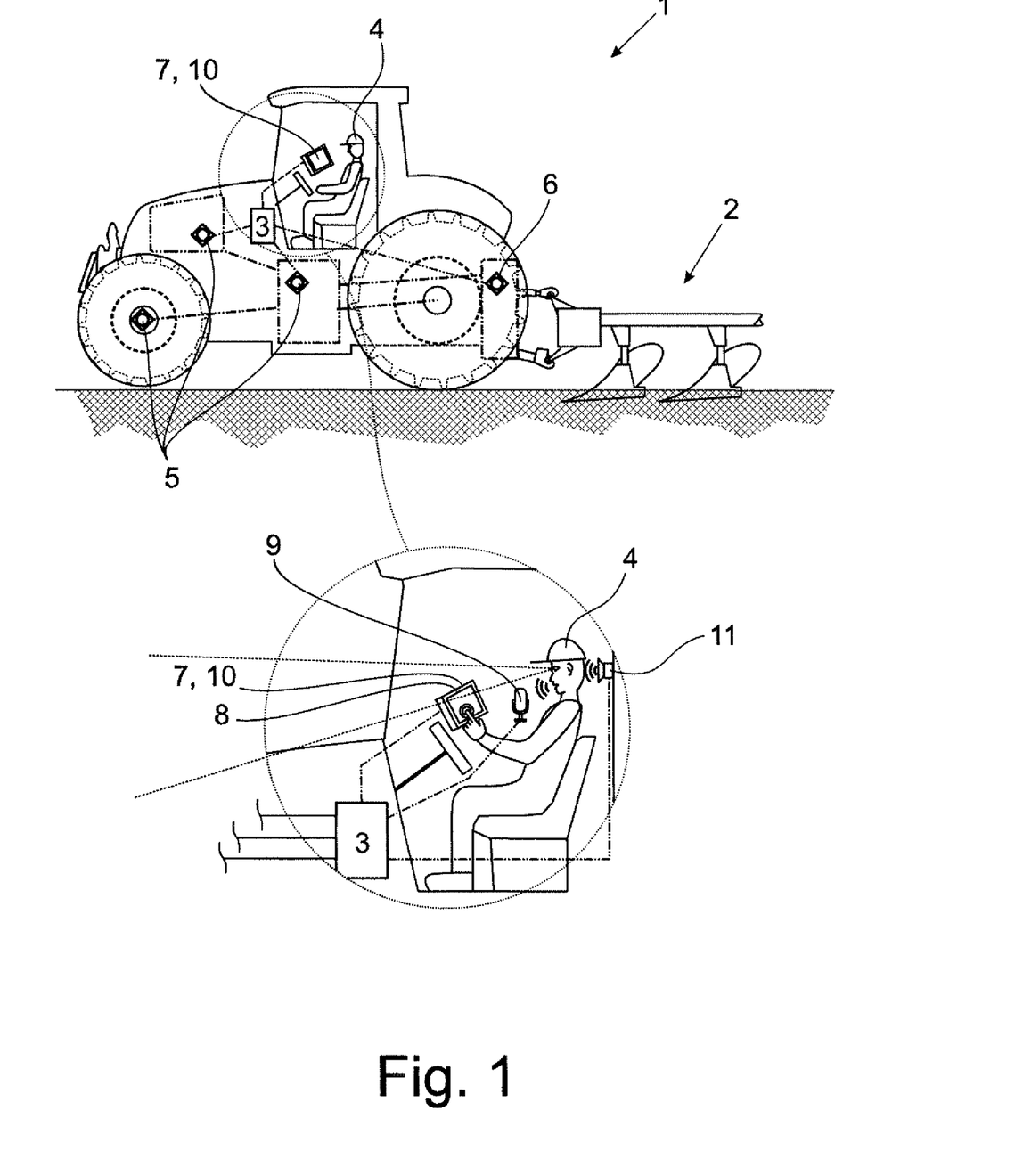
FIG. 1 shows a schematic view of an agricultural work system as proposed herein with an agricultural work machine in the form of a tractor and with a mounted implement in the form of a plow.

FIG. 1 shows how an agricultural work machine 1 in the form of a tractor carries out an agricultural work order, such as soil tillage by means of a work unit 2 for carrying out or supporting agricultural work, which here is a mounted implement in the form of a plow. Agricultural work machine 1 and work unit 2 or the mounted implement are part of an agricultural work system as proposed herein for optimizing operating parameters of work machine 1 and/or work unit 2. Agricultural work machine 1 has a driver assistance system 3 for detecting, processing and outputting data relating to the agricultural work order, soil tillage in the present instance. In this case, the data are operating parameters or operating parameter sets with a plurality of different operating parameters.

As proposed herein, driver assistance system 3 is configured to detect a plurality of operating parameters. As will be explained more fully later, the detection of the operating parameters can be carried out by sensors and/or by operator input and/or by retrieval from an internal and/or external data source, to name only some examples. The operating parameters, in the present instance and preferably, constitute an operating parameter set with a plurality of different operating parameters. One or more operating parameters of the set of operating parameters and the corresponding parameter values can be changed while carrying out the work order in order to effect an optimization. This is preferably carried out within the framework of an optimization routine which is selected and started by the operator 4 as will be explained more fully later.

Driver assistance system 3 allows the operator 4 to carry out a ranking of the set of operating parameters which, in the present case and preferably, contains the changed operating parameter and corresponding parameter value. By "ranking" is meant an evaluation of the set of operating parameters, that is, of the corresponding parameter values, by the operator 4 in which the operator 4 decides whether or not an improvement has been achieved in the work results by means of the effected change in the operating parameter or operating parameters of the set of operating parameters. The operator 4 accordingly decides whether the changed operating parameter or set of operating parameters is suitable or unsuitable for improving the work results. Accordingly, the operator 4 ranks the operating parameter or set of operating parameters particularly as suitable or unsuitable for the specific context, that is, the specific application. According to a special embodiment form, the operator 4 can decide during the ranking not only between "suitable" and "unsuitable" but can also carry out one or more gradations therebetween.

In the present instance and preferably, the set of operating parameters also contains, in addition to one or more machine parameters, one or more work parameters and environment parameters which make the actual context more specific, for example, the kind of agricultural machine and/or mounted implement, weather conditions and/or soil conditions, or the like, during the execution of the agricultural work order. Accordingly, as a result of the operator ranking, a conclusion can be made about the suitability of determined machine parameters in combination with determined work parameters and/or environment parameters (e.g., kind of agricultural machine and/or mounted implement, weather conditions and/or soil conditions).

The agricultural work system as proposed herein further provides a data pool in which previously ranked operating parameters or, in the present instance and preferably, operating parameter sets with different operating parameters are filed for later retrieval. A data pool of this type is, for example, a crowdsourced truth data pool in which only sets of operating parameters ranked as suitable from various sources, that is, from different driver assistance systems 3, are filed.

The operating parameters or, in this case, the sets of operating parameters are then submitted, as proposed herein, based on ranking, i.e., depending on the ranking results (e.g., "suitable" or "unsuitable") to an algorithm which generates optimized operating parameters or sets of operating parameters in a context-based manner for the adjustment of an agricultural work machine 1 and/or of a work unit 2. The data generated by the algorithm are accordingly operating parameters or sets of operating parameters which can be utilized by the agricultural work machine 1 and/or the work unit 2 and/or another agricultural work machine 1' or another work unit 2' so as to be operated in the same or similar context, that is, for example, under the same or similar weather conditions and/or soil conditions, with machine parameters optimized for the latter. Accordingly, by means of the algorithm, optimal adjustments can be determined in a context-based manner, which can also be utilized particularly for future uses of one and the same agricultural work machine 1 and/or one and the same work unit 2 or also in uses of other, particularly similar, combinations of agricultural work machine 1' and work unit 2' in order to achieve optimal work results.

In order to detect data, in particular the plurality of operating parameters or sets of operating parameters, the driver assistance system 3 in the present case and preferably is coupled with one or more sensors 5 of agricultural work machine 1 and/or with one or more sensors 6 of work unit 2. In order to detect data, it is also conceivable to connect to an internal data source of the agricultural work machine 1 and/or of the work unit 2 and/or to an external data source such as a GPS satellite, a weather station, the Internet or the farm-based computer or the like. For this purpose, driver assistance system 3 can also be coupled, as in the present instance, with at least one input device 7 for data input by the operator 4, in particular a keyboard, a touchscreen 8 and/or a microphone 9. The input device 7 can be part of agricultural work machine 1, work unit 2 and/or a mobile device. Machine parameters in particular and possibly at least also some work parameters and/or environment parameters can be detected via the respective sensor 5, 6. The operator 4 can enter further operating parameters, particularly machine parameters, work parameters and/or environment parameters which cannot be detected in an automated manner, for example, kind and/or type of agricultural machine and/or mounted implement, via input device 7 and convey them to driver assistance system 3.

As has already been described, driver assistance system 3 allows the operator 4 to rank operating parameters or, in this case, a respective operating parameter set with a plurality of different operating parameters. For the purpose of ranking, driver assistance system 3, in this instance and preferably, can output data to the operator 4, for example, detected operating parameters or sets of operating parameters to be ranked concretely by the operator 4, or can merely ask the operator 4 for an assessment of the changed situation. The output of data to the operator 4, for example, the output of a set of operating parameters or the output of an inquiry to the operator 4, is effected in particular via an output device 10, in particular a display, a touchscreen 8 and/or a loudspeaker 11, coupled with driver assistance system 3.

In a particularly preferred matter, driver assistance system 3 is suitable for natural language recognition of data submitted by the operator 4 and/or for natural language output of data to the operator 4.

In the present instance and preferably, a computer 12 is provided for applying the algorithm and a data storage 13 is provided for storing the ranked operating parameters or sets of parameters in the data pool. Data storage 13 also serves in this instance and preferably to store the optimized operating parameters or sets of operating parameters generated through application of the algorithm for the adjustment of an agricultural work machine 1 and/or at least a work unit 2. Computer 12 and/or the respective data storage 13 may be part of the agricultural work machine 1 but, in this instance and preferably, are part of an external computer network or a cloud 14 of the agricultural work system.

Figure 2:
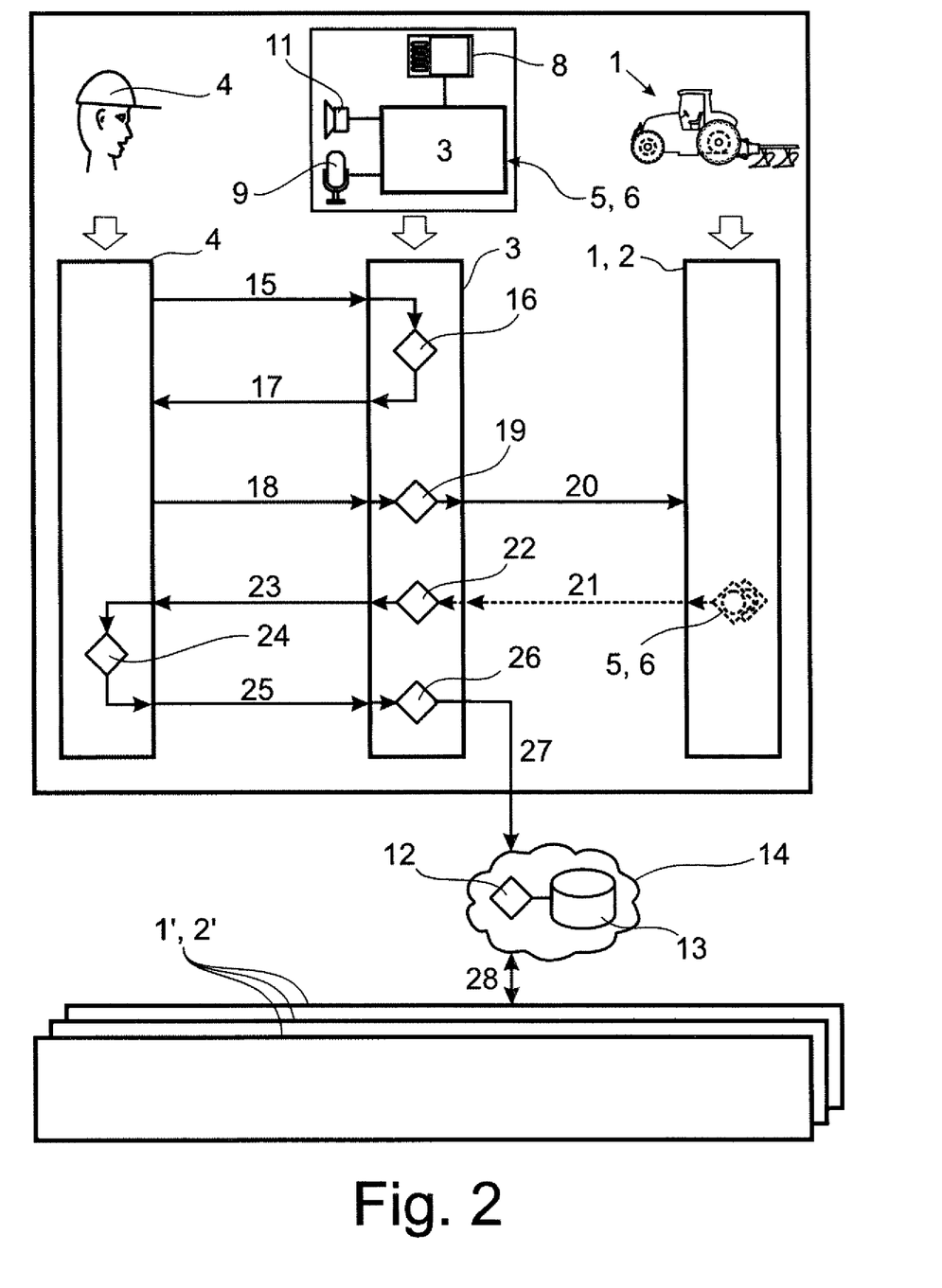
FIG. 2 shows a schematic diagram depicting a method for the optimization of operating parameters using the agricultural work system according to FIG. 1.

A cloud 14 with computer 12 and data storage 13 are depicted symbolically in FIG. 2. FIG. 2 also shows symbolically that other agricultural work machines and/or work units can also retrieve operating parameters or sets of operating parameters optimized by means of the algorithm from the cloud 14. FIG. 2 shows various combinations 1', 2' of other agricultural work machines and work units symbolically by rectangles. The depicted combinations 1', 2' which utilize the data from the cloud 14 can have the same kind of agricultural machine and/or mounted implement and/or the same type of agricultural machine and/or mounted implement as the combination of agricultural work machine 1 and work unit 2, described referring to FIG. 1, which provided the data to which the algorithm was applied.

In principle, it is also conceivable to submit data from different driver assistance systems of different combinations of agricultural work machine 1 and work unit 2 to the algorithm. Accordingly, it is preferably provided that a plurality of agricultural work machines 1 of the agricultural work system, in particular the same fleet, has in each instance a driver assistance system 3 for detecting, processing and outputting data relating to an agricultural work order, which driver assistance system 3 is configured to detect a plurality of operating parameters and to allow the operator 4 to rank the detected operating parameters or operating parameter sets with a plurality of different detected operating parameters, wherein individual ranked operating parameters or sets of operating parameters or all of the ranked operating parameters or sets of operating parameters are retrievably filed in the data pool and are submitted based on ranking to an algorithm for generating optimized operating parameters or sets of operating parameters for the adjustment of an agricultural work machine 1 and/or at least a work unit 2.

In this instance, the operating parameters are particularly machine parameters, work parameters and/or environment parameters.

The respective machine parameter is selected in particular from the group comprising driving speed, fuel consumption, delivered drive output, delivered drive torque, rotational speed of the driveshaft, engine lugging, shifting speed, parameters of the shifting characteristic, parameters of the slip control, parameters of the draught control, parameters of the full-load control, the air pressure and/or tire type of the front and/or rear pair of tires, the weight of a front and/or rear ballast device, parameters of the front and/or rear lift mechanism, the top link position, parameters of the traction cylinder, parameters of the hydraulic valve setting, the hollow disk position, the pull point, the pressing pressure, the support pressure, parameters of the conditioner column and/or parameters of the steering system and adjustment changes of the respective machine parameters.

The respective work parameter is selected in particular from the group comprising an agricultural work order, the kind and/or type of agricultural work machine, the kind and/or type of the respective work unit, in particular mounted implement, the mechanical, hydraulic and/or electrical connection of the respective work unit to the agricultural work machine, the ISOBUS machine settings, the power requirement of the respective work unit, the working depth and/or working width of the respective work unit, the land use and/or the area capacity.

The respective environment parameter is selected in particular from the group comprising the ground profile of the field and/or the current driving path, the size of the field, the current weather data, the GPS position data, the current crop, the current population variety, the current crop character of the field and/or of the current driving path (moisture, density, height), the current soil character of the field and/or of the current driving path (moisture, density, soil type, soil state), and/or the history of the field and/or of the current driving path, in particular the previous crop or a previous crop, population variety, crop character and/or soil character. Accordingly, not only field-related data but also path-related data can be utilized.

The sets of parameters to be ranked by the operator 4 are particularly combinations of one or more machine parameters, in particular one or more of the above-mentioned machine parameters, and/or one or more work parameters, particularly one or more of the above-mentioned work parameters, and/or one or more environment parameters, particularly one or more of the above-mentioned environment parameters.

In the present instance and preferably, the algorithm generates the optimized operating parameters or sets of operating parameters for determined combinations of operating parameters, particularly for determined combinations of an agricultural work machine 1, a work unit 2 and one or more environment parameters, particularly one or more of the above-mentioned environment parameters.

The driver assistance system 3 of the agricultural work system as proposed herein is configured, in the present instance and preferably, in such a way that the operator 4 can select an optimization routine particularly via a selection menu which is displayed and/or acoustically conveyed to the operator 4. In the optimization routine, at least one predetermined operating parameter, preferably at least one machine parameter, particularly at least one of the previously mentioned machine parameters, is changed according to a predetermined rule. Based on the at least one changed operating parameter, the driver assistance system 3 allows the operator 4, as mentioned earlier, to rank the operating parameter or, in this instance, a set of parameters which contains this operating parameter and one or more further operating parameters.

In this instance and preferably, the operator 4 can select the optimization routine from the group comprising the optimization of the quality of the working process, the optimization of the efficiency of the working process and the optimization of the work output.

Criteria for the quality of the working process are, for example, the plow pattern, the distribution pattern, the swath position, or the like, as well as soil damage such as soil compaction and/or soil smearing. Criteria for the efficiency of the working process are, for example, the fuel consumption related to the driving speed of the agricultural work machine 1, the fuel consumption per area unit related to the driving speed of the agricultural work machine 1, the fuel consumption related to the time required for carrying out an agricultural work order, or the fuel consumption per area unit related to the time required for carrying out an agricultural work order. Criteria for the work output are, for example, the worked area per unit of time or the worked area per unit of time related to the driving speed of the agricultural work machine 1.

In the present instance and preferably, driver assistance system 3 is further configured to display to the operator 4 after a corresponding operating routine has been selected by the operator 4 one or more suggestions for the at least one operating parameter to be changed. The operator 4 is then given the option of accepting and/or declining the suggestion or at least one of the suggestions. For example, the operator 4 is presented with a list of a plurality of suggestions which, in particular, is sorted according to a determined sequence, for example, according to the degree of the anticipated effect on the quality of the working process and/or on the efficiency of the working process and/or on the work output. It is also possible that only one suggestion is displayed to the operator 4 and, if the operator 4 declines this suggestion, a new suggestion is displayed. In this instance also, a determined sequence in which the suggestions are displayed can be provided, this sequence being governed by the degree of the anticipated effect on the quality of the working process and/or on the efficiency of the working process and/or on the work output.

After a suggestion has been accepted by the operator 4, the driver assistance system 3 in the present instance and preferably executes the optimization routine such that at least one changed operating parameter, particularly machine parameter, or set of operating parameters with at least one changed operating parameter is generated as result, whereupon the operator 4 can then carry out a ranking of the changed operating parameter or set of operating parameters by personally assessing the quality of the working process, the efficiency of the working process or the work output compared to the state prior to the change in the operating parameter or set of operating parameters. For purposes of assessment, driver assistance system 3 can ask the operator 4, particularly acoustically and/or visually, the question, for example, whether an improvement in the quality of the working process or in the efficiency of the working process or in the work output can be determined. The operator 4 can then respond to the question, particularly through speech input, touchscreen input or keyboard input, for example, with a 'yes' or 'no'.

Finally, driver assistance system 3 can be configured to carry out an assessment of the reasonableness of the data entries of the operator 4. For example, it may happen that the operator 4 makes an erroneous entry which would lead to an erroneous ranking. The driver assistance system 3 can then verify according to predetermined rules whether or not the entry makes sense. In this way, erroneously ranked operating parameters or sets of operating parameters can be prevented from being recorded in the data pool and submitted to the algorithm.

FIG. 2 shows an exemplary flow of a method for optimizing operating parameters using an agricultural work system as proposed herein.

The driver assistance system 3 detects various operating parameters in various ways, for example, via one or more sensors 5 of the agricultural work machine 1 and/or via one or more sensors 6 of the respective work unit 2. In this case, there is also a possibility to use a sensor fusion in which data from different sensors 5, 6 can be linked in order to obtain higher-quality information. Further, according to FIG. 2 the driver assistance system 3 is provided with a touchscreen 8 and/or a microphone 9 for data input by the operator 4. In this case and preferably, driver assistance system 3 is provided with a loudspeaker 11 and touchscreen 8 for displaying data to the operator 4.

In the embodiment example of the method as proposed herein which is depicted here, the operator 4 can start an optimization routine (arrow 15), whereupon driver assistance system 3 generates a list with suggestions in the form of changeable machine parameters (symbol 16).

The list with the generated suggestions is then displayed to the operator 4, for example, in natural language (arrow 17).

The operator 4 then selects a suggestion from the list (arrow 18), whereupon the driver assistance system 3 generates at least one changed machine parameter (symbol 19) and conveys a corresponding control command to the agricultural work machine 1 and/or the work unit 2 (arrow 20).

The agricultural work machine 1 and/or work unit 2 then changes the parameter settings correspondingly. It is also possible, particularly when no automatically adjustable actuator is provided, that the driver personally changes the parameter setting, for example, adjusts a different top link position by bolting the top link in a different manner. Accordingly, the work results, for example, the quality of the working process, the efficiency of the working process or the work output, can be changed.

Optionally, the machine parameter or machine parameters can also be determined via sensors 5, 6 of the agricultural work machine 1 and/or work unit 2 and transmitted to the driver assistance system 3 (arrow 21).

After the change of the at least one machine parameter has been carried out, the driver assistance system 3 generates an inquiry (symbol 22) which is conveyed to the operator 4, possibly together with the display of the changed machine parameter or set of operating parameters with the changed machine parameter (arrow 23).

The operator 4 then personally carries out a decision process based on an assessment of the overall situation (symbol 24) and conveys the result to the driver assistance system (arrow 25) by corresponding input, for example, via the touchscreen 8 or the microphone 9.

The driver assistance system 3 then carries out a processing of the data which, for example, comprises a fusion of the changed machine parameter with other operating parameters, for example, environment parameters (symbol 26). In so doing, the driver assistance system 3 can also carry out an evaluation of the reasonableness of data entered by the operator 4.

The prepared data are then transmitted to the cloud 14 which has a computer 12 for applying an algorithm for generating optimized operating parameters or sets of operating parameters and a data storage 13 for storing the ranked operating parameters or sets of operating parameters and possibly for storing the optimized operating parameters or sets of operating parameters generated by applying the algorithm (arrow 27).

Lastly, the optimized operating parameters or sets of operating parameters generated by the algorithm can be transferred to different combinations 1', 2' of agricultural work machine 1 and working unit 2, and these are used as operating parameters or sets of operating parameters which are optimized for the respective application. The data proper to the different combinations 1', 2' of agricultural work machine 1 and work unit 2 can also preferably be transferred to the cloud 14, particularly in the manner described above, through optimized operating parameters or sets of operating parameters generated by a corresponding algorithm (arrow 28).

REFERENCE NUMERALS 1 agricultural work machine
2 work unit
3 driver assistance system
4 operator
5, 6 sensors
7 input device
8 touchscreen
9 microphone 10 output device
11 loudspeaker
12 computer
13 data storage
14 external computer network (cloud)
15-28 flowchart symbols
1', 2' work machine/work unit combinations

What is claimed is:

1. An agricultural work system for the optimization of operating parameters, comprising:
   at least one agricultural work machine in the form of a tractor, the agricultural work machine having a driver assistance system for detecting, processing and outputting data relating to an agricultural work order, and
   at least one work unit coupled to the agricultural work machine for carrying out or supporting agricultural work,
   wherein the driver assistance system is configured to detect a plurality of operating parameters and to allow the operator to rank the detected operating parameters or operating parameter sets with a plurality of different detected operating parameters and to accept data input by the operator of the ranked operating parameters such that individual ranked operating parameters or sets of operating parameters or all of the ranked operating parameters or sets of operating parameters are retrievably filed in a data pool,
   wherein the operating parameters or sets of operating parameters are submitted based on ranking to an algorithm that generates optimized operating parameters or sets of operating parameters for the adjustment of the agricultural work machine and/or of the at least one work unit, and
   wherein the driver assistance system is configured for natural language recognition of data conveyed by the operator and/or for natural language output of data to the operator.

2. The agricultural work system according to claim 1, wherein the driver assistance system is coupled to at least one input device in the form of a keyboard, touchscreen or microphone for the input of data by the operator.

3. The agricultural work system according to claim 1, wherein the driver assistance system is coupled to at least one output device in the form of a display, a touchscreen and/or a loudspeaker for outputting data to the operator, the data comprising previously detected operating parameters or sets of operating parameters to be ranked by the operator and/or an inquiry relating to the ranking of previously detected operating parameters or sets of operating parameters.

4. The agricultural work system according to claim 1, further comprising a computer that is part of the agricultural work machine or part of an external network of the agricultural work system, the computer being configured for applying the algorithm, and a data storage configured for storing the ranked operating parameters or sets of operating parameters in the data pool and particularly for storing the optimized operating parameters or sets of operating parameters generated by applying the algorithm for adjusting the agricultural work machine and/or the at least one work unit.

5. The agricultural work system according to claim 1, wherein there is a plurality of the agricultural work machines of the agricultural work system, and wherein each one of the agricultural work machines has the driver assistance system.

6. The agricultural work system according to claim 5, wherein the driver assistance system of each agricultural work machine is configured for retrieving operating parameters or sets of operating parameters of other agricultural work machines and/or work units of the agricultural work system which are optimized by application of the algorithm, as well as operating parameters or sets of operating parameters of other combinations of agricultural work machines and work units.

7. The agricultural work system according to claim 1, wherein the driver assistance system is configured to detect one or more machine parameters of the agricultural work machine and/or of the respective work unit, one or more work parameters and/or one or more environment parameters as operating parameters.

8. The agricultural work system according to claim 7, wherein the respective machine parameter is selected from the group consisting of: driving speed, fuel consumption, delivered drive output, delivered drive torque, rotational speed of the driveshaft, engine lugging, shifting speed, parameters of the shifting characteristic, parameters of the slip control, parameters of the draught control, parameters of the full-load control, the air pressure and/or tire type of the front and/or rear pair of tires, weight of a front and/or rear ballast device, parameters of a front and/or rear lift mechanism, a top link position, parameters of a traction cylinder, parameters of a hydraulic valve setting, a hollow disk position, a pull point, pressing pressure, support pressure, parameters of a conditioner column and parameters of a steering system, and adjustment changes of the respective machine parameters; and/or wherein the respective work parameter is selected from the group consisting of: an agricultural work order, a kind and/or type of agricultural work machine, a kind and/or type of the respective work unit, a mechanical, hydraulic and/or electrical connection of the respective work unit to the agricultural work machine, ISOBUS machine settings, a power requirement of the respective work unit, a working depth and/or working width of the respective work unit, land use and/or area capacity; and/or wherein the respective environment parameter is selected from the group consisting of: a ground profile of the field and/or the current driving path, size of a field, current weather data, GPS position data, current crop, current population variety, current crop character of the field and/or of a current driving path, current soil character of the field and/or of the current driving path, and history of the field and/or of the current driving path.

9. The agricultural work system according to claim 8, wherein the sets of parameters to be ranked are combinations of one or more of the machine parameters, one or more of the work parameters, and/or one or more of the environment parameters.

10. The agricultural work system according to claim 8, wherein the algorithm is configured to generate the optimized operating parameters or sets of operating parameters for determined combinations of operating parameters, for determined combinations of the agricultural work machine, the work unit and one or more environment parameters.

11. The agricultural work system according to claim 1, wherein the driver assistance system is configured so that the operator can select via a selection menu an optimization routine in which at least machine parameter is changed according to a predetermined rule, and subsequently, based on the at least one changed operating parameter, the driver assistance system allows the operator to rank the changed operating parameter or a set of parameters which contains this changed operating parameter and further operating parameters, wherein the optimization routine is selected from the group consisting of optimization of a quality of a working process, optimization of efficiency of the working process and optimization of work output.

12. The agricultural work system according to claim 11, wherein the driver assistance system is configured to display to the operator after an operating routine has been selected by the operator one or more suggestions for the at least one operating parameter to be changed, and to give the operator an option of accepting and/or declining the suggestion or at least one of the suggestions.

13. The agricultural work system according to claim 1, wherein the driver assistance system is configured to carry out an assessment of reasonableness of data entries of the operator.

14. A method for optimization of operating parameters using an agricultural work system, with at least one agricultural work machine in the form of a tractor, and with at least one work unit coupled to the agricultural work machine for carrying out or supporting agricultural work, wherein the agricultural work machine has a driver assistance system for detecting, processing and outputting data relating to an agricultural work order, comprising:
  detecting a plurality of operating parameters by the driver assistance system,
  ranking by an operator the detected operating parameters or operating parameter sets with a plurality of different detected operating parameters,
  retrievably filing individual ranked operating parameters or sets of operating parameters or all of the ranked operating parameters or sets of operating parameters in a data pool, and
  submitting the operating parameters or sets of operating parameters based on ranking to an algorithm for generating optimized operating parameters or sets of operating parameters for the adjustment of the agricultural work machine and/or of the at least one work unit.

* * * * *